US010799839B1

(12) United States Patent
Brookins

(10) Patent No.: US 10,799,839 B1
(45) Date of Patent: Oct. 13, 2020

(54) MULTIFUNCTIONAL MISTING SYSTEM

(71) Applicant: Keith Donald Brookins, Miami, FL (US)

(72) Inventor: Keith Donald Brookins, Miami, FL (US)

(73) Assignee: ZAP MOSQUITO SOLUTIONS INC., Miami, FL (US)

( * ) Notice: Subject to any disclaimer, the term of this patent is extended or adjusted under 35 U.S.C. 154(b) by 154 days.

(21) Appl. No.: 16/161,286

(22) Filed: Oct. 16, 2018

(51) Int. Cl.
*B01F 3/04* (2006.01)
*A01M 1/20* (2006.01)
*A01M 7/00* (2006.01)

(52) U.S. Cl.
CPC ....... *B01F 3/04056* (2013.01); *A01M 1/2038* (2013.01); *A01M 7/001* (2013.01); *A01M 7/0021* (2013.01); *A01M 7/0039* (2013.01); *B01F 3/04021* (2013.01); *B01F 3/04049* (2013.01)

(58) Field of Classification Search
CPC ..... B01F 3/04; B01F 3/04021; B01F 3/04049
USPC .................................................. 261/76, 115
See application file for complete search history.

(56) References Cited

U.S. PATENT DOCUMENTS

| 7,090,147 | B2 | 8/2006 | Lovett |
| 7,320,439 | B2 | 1/2008 | Davis et al. |
| 7,540,433 | B2 | 6/2009 | Fleming et al. |
| 8,430,337 | B2 | 4/2013 | Pearce et al. |
| 8,994,529 | B2 | 3/2015 | White |
| 9,358,569 | B2 | 6/2016 | Burt et al. |
| 9,414,580 | B2 | 8/2016 | Barry et al. |
| 10,028,497 | B1 | 7/2018 | Brookins |
| 2008/0029614 | A1 | 2/2008 | Dore |
| 2008/0067263 | A1 | 3/2008 | Modlin et al. |
| 2009/0183689 | A1 | 7/2009 | Moore et al. |
| 2009/0265977 | A1 | 10/2009 | Sullivan et al. |
| 2012/0319309 | A1* | 12/2012 | Sorola ............... B01D 47/00 261/28 |
| 2019/0079480 | A1* | 3/2019 | Sun .................. G06F 3/016 |

\* cited by examiner

*Primary Examiner* — Robert A Hopkins
(74) *Attorney, Agent, or Firm* — Albert Bordas, P.A.

(57) ABSTRACT

A multifunctional misting system having a housing assembly, a frame assembly, a mist blower assembly, a valve assembly, a recess control panel assembly, a pump-motor assembly, a tank assembly, and a handle assembly. The housing assembly has first and second flat panels, a front panel, a rear panel, a top panel, a bottom panel, and locking corners. The frame assembly has first and second frames, and a battery with a battery retainer. The mist blower assembly has a blower and nozzles. The pump-motor assembly is a motor attached to a pump. The motor has a motor-battery bracket fixed to the motor and a spacer. The handle assembly is positioned onto the top panel of the housing assembly. The multifunctional misting system may operate as a mist blower.

13 Claims, 14 Drawing Sheets

MULTIFUNCTIONAL MISTING SYSTEM

BACKGROUND OF THE INVENTION

1. Field of the Invention

The present invention relates to multifunctional misting systems, and more particularly to misting systems, portable mist blowing systems, and portable misting wand systems.

2. Description of the Related Art

Applicant believes that one of the closest references corresponds to Applicant's own U.S. Pat. No. 10,028,497 issued to Keith Donald Brookins on Jul. 24, 2018 for Misting system. However, it differs from the present invention because Brookins teaches a misting system having an external compartment, an interior housing, a container housing, an electrical compartment, a lid assembly, and at least one outlet. The external compartment has a top face with a hole, a cavity, and an electrical cover panel. The interior housing has a top face with a hole, and lateral faces with a respective pivot hole. The container housing has lateral faces having pivoting protrusions, which are positioned onto each pivot hole of the interior housing lateral faces. The electrical compartment has a cover panel, a battery and a pump assembly. The lid assembly has a locking tab, a panel locking tab, a latching-limiter rod, and a spear. The electrical cover panel of the external compartment mounts onto the electrical compartment, and the cover panel of the electrical compartment mounts onto the external compartment. The lid assembly covers the external compartment and the electrical compartment.

Applicant believes that another reference corresponds to U.S. Patent Application Publication No. 2009/0265977, published on Oct. 29, 2009 to Helen Joyce Sullivan, et al. for Portable Insect Misting System. However, it differs from the present invention because Sullivan, et al. teach a portable, light-activated, mist sprayer system comprising a direct current power supply, a container of treating fluid at a desired concentration; a motor and a pump that is activated at the appropriate time as determined by the switch or timer; at least one sprayer nozzle that will dispense a mist containing the treating fluid whenever the pump is operating; and a timer that turns off the pump after a preset interval to terminate the spraying cycle. The system sprays dilute solutions of insecticide or insect repellent in a mobile fashion while in areas away from a power source or away from larger stored amounts of insecticides.

Applicant believes that another reference corresponds to U.S. Patent Application Publication No. 2009/0183689, published on Jul. 23, 2009 to Gary Stephen Moore, et al. for Portable, rechargeable insect control apparatus and method of operation. However, it differs from the present invention because Moore, et al. teach a system for controlling insects that include an insect control compound reservoir. A pump receives an insect control compound from the insect compound reservoir and pressurizes the insect control compound. A rechargeable battery provides power to the pump. A plurality of nozzles receives the pressurized insect control compound and generates an insect control compound mist. A controller receives a first command to cause the pump to begin operation and a wireless signal to cause the pump to stop operation.

Applicant believes that another reference corresponds to U.S. Patent Application Publication No. 2008/0067263, published on Mar. 20, 2008 to Kemper O'neal Modlin, et al. for Automated pest misting system with pump. However, it differs from the present invention because Modlin, et al. teach a system and method for controlling adult populations of flying pests. A self-contained reservoir system for automated misting of pesticides can be operated in remote location without the availability of line power or pressurized water. The automated spraying system comprises a secure controller unit with locking features, and a plurality of dispersing elements attached to the unit. Enclosed within the weatherproof and secure enclosure of the unit is a controller, a pump, a pesticide reservoir, and a power source for delivering controlled amounts of a pesticide mixture to the dispersing elements. The pump is capable of producing pressures sufficient for producing a mist from the dispersing elements. The pesticide reservoir holds pre-measured and premixed pesticide that can be used for direct treatment of an area. A misting schedule is entered into the controller or timer. At the predetermined misting times, the controller completes the circuit between the battery and pump, thereby energizing the pump and causing the pesticide mixture to be pumped into the dispersing elements. The unit may be fitted with safety and efficiency components that automatically discontinue the misting cycles if someone is present in the area, weather conditions are not optimal, a fault is detected, or pest activity is not favorable for a treatment.

Applicant believes that another reference corresponds to U.S. Patent Application Publication No. 2008/0029614, published on Feb. 7, 2008 to David James Dore for Mist-spraying apparatus. However, it differs from the present invention because Dore teaches a mist-spraying apparatus primarily but not exclusively for use in an enclosed space that includes an air-blowing mechanism, a spraying mechanism and, a control mechanism. The air-blowing mechanism defines an outlet conduit through which air can be blown and an inlet conduit through which air from within the space can be drawn. The spraying mechanism includes a pump for delivering liquid from a reservoir to an atomizing nozzle for spraying. The atomizing nozzle is located within the outlet conduit so that atomized particles emitted by the atomizing nozzle are entrained in the airstream emitted by the air-blowing mechanism and thereby distributed evenly throughout the space. The control mechanism controls operation and is adapted to commence operation of the air-blowing prior to operation of the atomizing nozzle and to continue operation of the air-blowing after operation of the nozzle has ceased.

Applicant believes that another reference corresponds to U.S. Pat. No. 9,414,580 issued to Barry, et al. on Aug. 16, 2016 for Heatless and cordless fogging/misting apparatus having a low CFM DC-powered blower motor and a mixing chamber for ultra-low volume atomized fog. However, it differs from the present invention because Barry, et al. teach a portable fogger apparatus that includes a portable fogger body having at least one airflow passageway. A DC blower motor is connected to the fogger body proximate to the airflow passageway and receives power from a battery, wherein the DC blower motor produces airflow through the passageway. A mixing chamber is positioned along the at least one passageway, wherein at least a portion of the airflow is movable through the mixing chamber. A quantity of pressurized fogging liquid is housed within a container connected to the logger body. The pressurized fogging liquid is dispensable from the container into the mixing chamber where it is expelled through a nozzle and mixed with the airflow to produce a fog. The fog has an atomized micron particulate size between 5 and 60 microns. An activation controls activation of the DC blower motor and/or dispensing of the pressurized fogging liquid.

Applicant believes that another reference corresponds to U.S. Pat. No. 9,358,569 issued to Burt, et al. on Jun. 7, 2016 for Ultrasonic surface treatment device and method. However, it differs from the present invention because Burt, et al. teach devices, which generate a mist of a treatment composition, and an aerosolized treatment composition, which imparts a technical benefit to surfaces, or airspaces, which come into contact with the aerosolized treatment composition.

Applicant believes that another reference corresponds to U.S. Pat. No. 8,994,529 issued to Jeffrey C. White on Mar. 31, 2015 for Mosquito misting system and method for using same. However, it differs from the present invention because White teaches an apparatus and method for controlling and monitoring a mosquito misting system. The apparatus includes a chemical reservoir, a delivery system, a spray system, one or more sensors, a communication network and a misting management unit. The sensors may detect normal and abnormal operations of the misting system and send this data to the misting management unit. The misting management unit may then analyze the data and determine the problem. If the problem can be fixed without personnel, the misting management unit may simply adjust the system and fix the problem. If the problem requires personnel, the system may automatically schedule the service call based on a number of criteria.

Applicant believes that another reference corresponds to U.S. Pat. No. 8,430,337 issued to Pearce, et al. on Apr. 30, 2013 for Light-activated portable aerosol mist sprayer device. However, it differs from the present invention because Pearce, et al. teach a portable, light-activated, mist sprayer system comprising direct current power supply, an ambient light sensor, electronic circuitry that evaluates an electrical signal received from the light sensor to determine whether a "dusk" or "dawn" light condition exists; a container of treating fluid at a desired concentration; a motor and pump that are activated at the appropriate time as determined by the sensed light condition; at least one sprayer nozzle that will dispense a mist containing the treating fluid whenever the pump is operating; and a timer that turns off the pump after a preset interval to terminate the spraying cycle. The system is spraying dilute solutions of insecticide or insect repellent during the periods of significant insect activity that typically occur around dusk and dawn.

Applicant believes that another reference corresponds to U.S. Pat. No. 7,540,433 issued to Fleming, et al. on Jun. 2, 2009 for Insect control system and method. However, it differs from the present invention because Fleming, et al. teach an automated insect control system, which utilizes a container tank, a canned pump, distribution system, and a programmable digital timer to allow a user to control the times per day and the duration in which to apply insecticide to an area. A remote control is provided which permits a user to commence and terminate spraying of insecticide as the need arises without resorting to reprogramming of the spraying schedule.

Applicant believes that another reference corresponds to U.S. Pat. No. 7,320,439 issued to Davis, et al. on Jan. 22, 2008 for Self-contained insect repelling and killing apparatus. However, it differs from the present invention because Davis, et al. teach an apparatus for the purpose of dispensing a chemical agent whose function is to detract or alternatively attract and destroy, insects, in particular, flying insects. The apparatus consists of a chemical source, a connection to a fluid source, usually water, a reservoir for chemical mixing and a pump for mixing and creating pressure. Mixing reservoir is of such size to eliminate any chance of chemical mixture separation and where the chemical mixture is agitated prior to each dispensing cycle. Fluid is disbursed under pressure through a series of atomizing devices, interconnected to the apparatus through a flexible plastic delivery conduit. The apparatus functions are controlled through the use of an electronic interface. Preferred agent used is pyrethrum based, naturally occurring or synthesized, which possesses an antagonistic effect toward targeted pests but apparatus is designed to be adaptable to a wide-range chemical.

Applicant believes that another reference corresponds to U.S. Pat. No. 7,090,147 issued to Rod Lovett on Aug. 15, 2006 for Mosquito misting system. However, it differs from the present invention because Lovett teaches a mosquito misting system having a liquid reservoir that is operably associated with a fluid pump and motor and fluid conduits to transmit a fluid insecticide to one or more dispersal nozzles. A controller is used to control the frequency and duration of dispersal. An agitator device is associated with the fluid reservoir to adequately agitate the insecticide mixture within the reservoir during or just prior to dispersal of the fluid insecticide. The controller is interconnected with a level sensor assembly to provide a graphic indication of the level of fluid insecticide remaining in the reservoir. Additionally, the misting system is provided with a fluid pressure switch that detects a rupture in the fluid conduit and prevents further flow of fluid from the reservoir. The system has remote control and, a remote monitoring feature that allows improved service and maintenance for the system.

Other patents describing the closest subject matter provide for a number of more or less complicated features that fail to solve the problem in an efficient and economical way. None of these patents suggest the novel features of the present invention.

SUMMARY OF THE INVENTION

The present invention is a multifunctional misting system, comprising a housing assembly, a frame assembly, a mist blower assembly, a valve assembly, a recess control panel assembly, a pump-motor assembly, a tank assembly, and a handle assembly. The multifunctional insecticide delivery system may operate as a misting system, a portable mist blowing system, and a portable misting wand system.

The housing assembly comprises first and second flat panels, a front panel, a rear panel, a top panel, a bottom panel, and locking corners. The front panel comprises a blower panel hole, a control panel hole, and a valve threaded neck hole. The top panel comprises a tank neck hole. The frame assembly comprises first and second frames each having a top wall, first and second lateral stiffeners, and a bottom panel attachment base respectively. The frame assembly further comprises a battery and a battery retainer.

The mist blower assembly comprises a blower having a blower outlet and a blower inlet, first and second blower bases, a recess blower panel, a blower shroud, a blower shroud flapper, bulkhead supply tubes, and nozzles.

The valve assembly comprises a valve body, a threaded valve neck, first and second outlet ports, an inlet port, and a valve handle. The valve assembly further comprises a manifold, first and second adapting elbow, thru adapter, a tube, an input connector, output connector ports, an input connector port, output connectors, a pressure switch, and a pressure switch port.

The recess control panel assembly comprises a recess control panel, a control bezel, a switch, and a power jack.

The pump-motor assembly comprises a motor attached to a pump. The pump comprises a pump inlet connector, a pump outlet connector, a pump base, an outlet tube, and an inlet tube.

The motor comprises a motor-battery bracket fixed to the motor and a spacer. The motor-battery bracket comprises bracket lateral walls.

The tank assembly comprises a front side, lateral sides, bottom side, a top side, a tank neck, a cap with a duckbill vent hole, and a self locking tank strap. The front side comprises a hardware face having a float port with a tank float switch, and an outlet port with a pick up nipple. The lateral sides each comprise strap recess and an air gap rib.

The handle assembly comprises a handle body having a wire passage, a micro switch hole, a cover plate, a micro switch, and a light-emitting diode housing with a light-emitting diode.

The mist blower assembly is mounted on the blower panel hole. The recess control panel assembly is mounted on the control panel hole, and the threaded valve neck with the valve handle mounted thereon extends from the valve threaded neck hole. The blower shroud fits into the blower and the blower shroud houses the blower shroud flapper, which is secured by the recess blower panel. The frame assembly secures the mist blower assembly, the pump-motor assembly and the battery. The housing assembly houses the frame assembly and the tank assembly, wherein the tank assembly is exteriorly secured to the frame assembly by the self-locking tank strap.

It is therefore one of the main objects of the present invention to provide multifunctional misting systems.

It is another object of this invention to provide a multifunctional misting system that supports stationary nozzles.

It is another object of this invention to provide a multifunctional misting system having a mist blowing ability.

It is another object of this invention to provide a multifunctional misting system that is portable.

It is another object of this invention to provide a multifunctional misting system that is self-contained with a rechargeable battery and reservoir for months of operation.

It is another object of this invention to provide a multifunctional misting system that has a universal AC charger that makes it chargeable anywhere in the world.

It is another object of this invention to provide a multifunctional misting system that is volumetrically efficient for carrying, transporting, and storage.

It is another object of this invention to provide a multifunctional misting system that can be readily assembled and disassembled without the need of any special tools.

It is another object of this invention to provide a multifunctional misting system, which is of a durable and reliable construction.

It is yet another object of this invention to provide a multifunctional misting system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
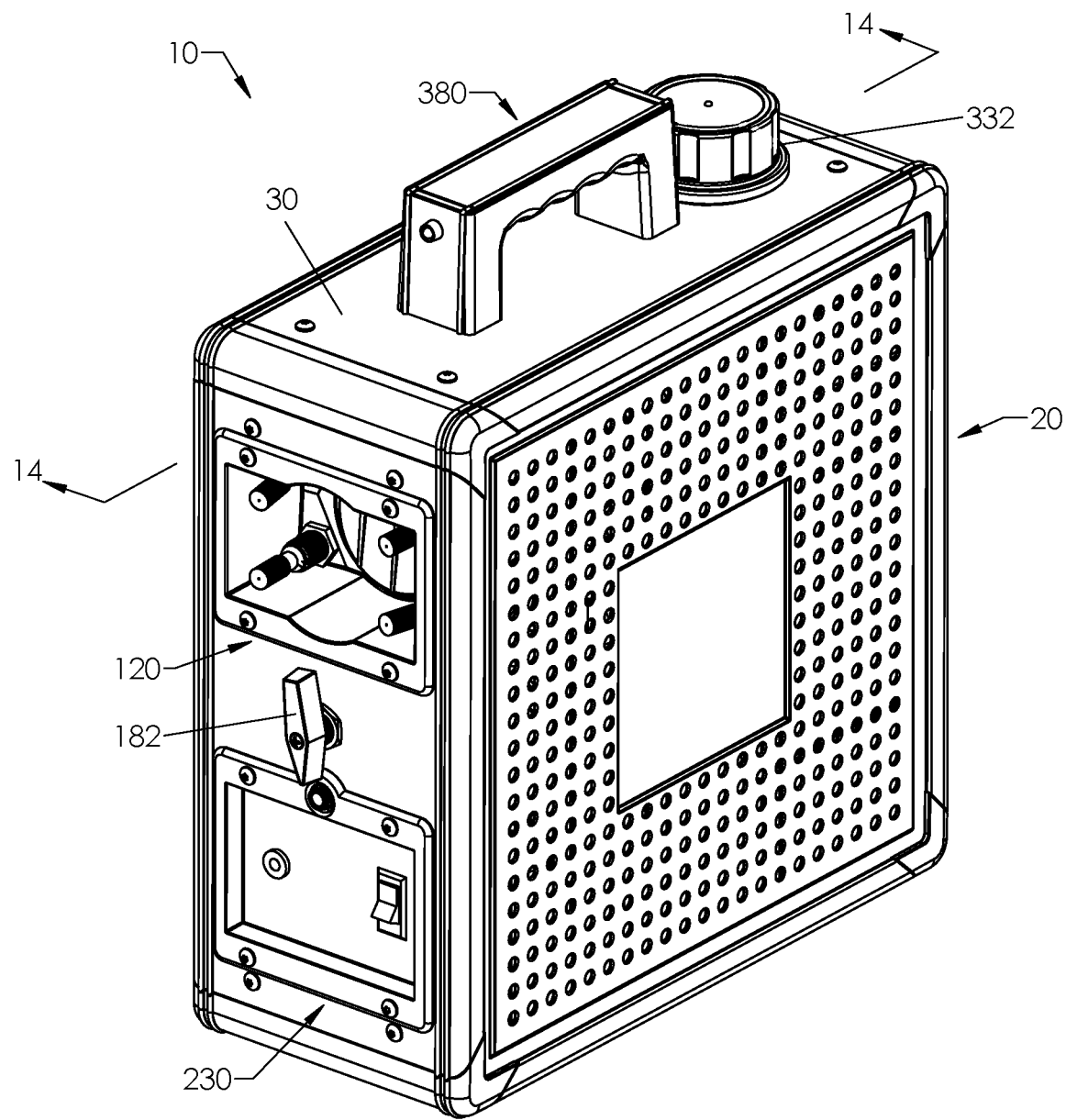
FIG. 1 is an isometric view of the present invention.

Referring now to the drawings, the present invention is a multifunctional misting system for solutions of insecticide or insect repellent but not limited to, and is generally referred to with numeral 10. It can be observed that it basically includes housing assembly 20, frame assembly 70, mist blower assembly 120, valve assembly 170, recess control panel assembly 230, pump-motor assembly 260, tank assembly 320, and handle assembly 380.

Multifunctional misting system 10 may operate as a misting system, a portable mist blowing system, and a portable misting wand system.

Figure 2:
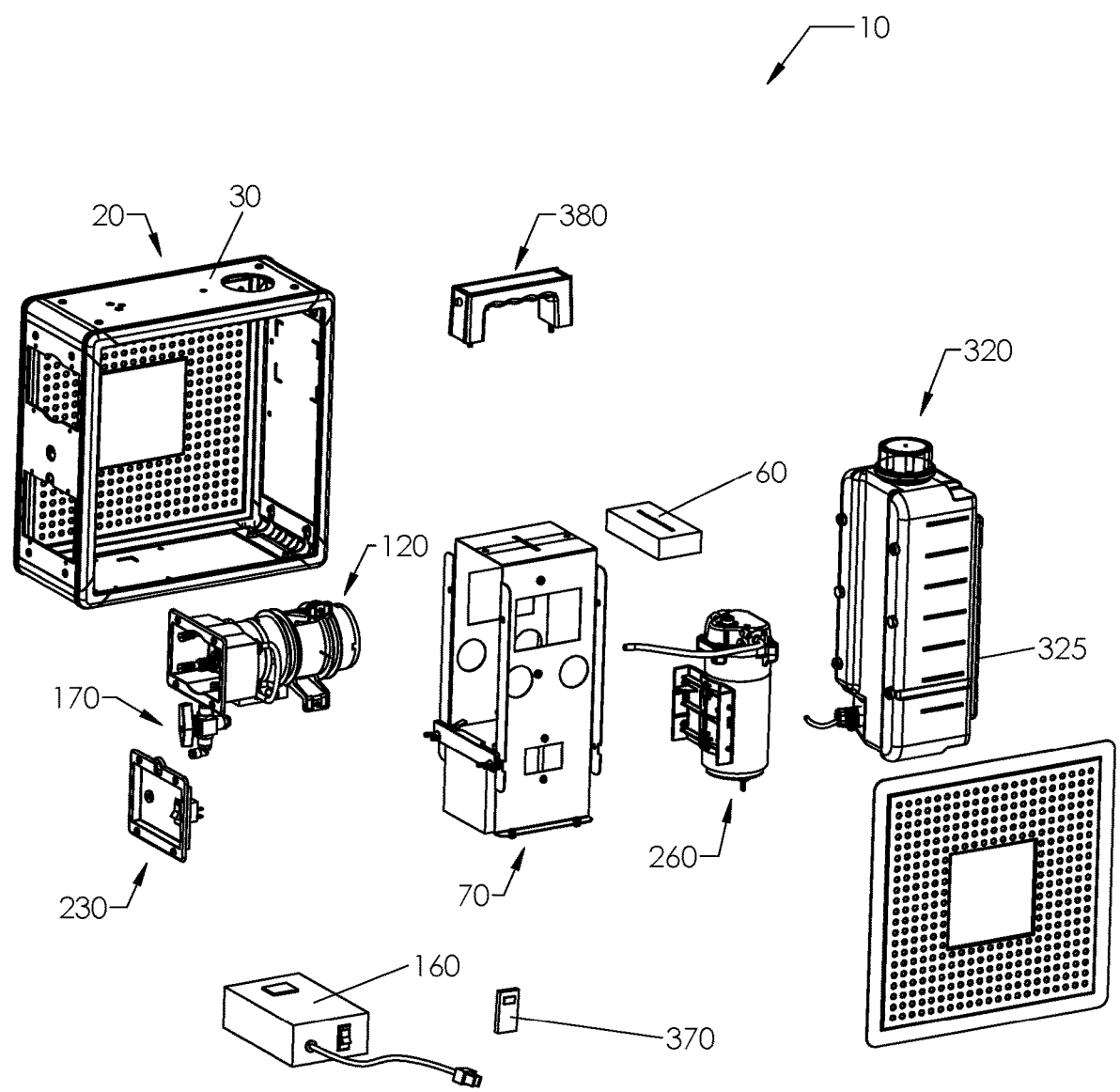
FIG. 2 is an exploded view of the present invention.
Figure 3:
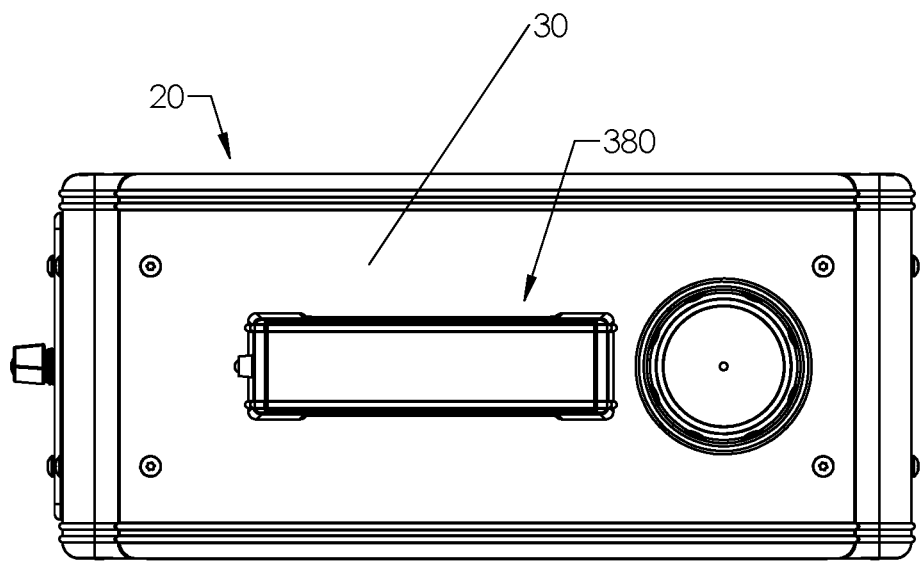
FIG. 3 is a top view of the present invention.

As seen in FIGS. 1, 2, and 3 present invention 10 comprises housing assembly 20, frame assembly 70, mist blower assembly 120 with valve assembly 170, recess control panel assembly 230, pump-motor assembly 260, tank assembly 320, and handle assembly 380.

Housing assembly 20 houses frame assembly 70, mist blower assembly 120 with valve assembly 170, recess control panel assembly 230, pump-motor assembly 260, and tank assembly 320. Handle assembly 380 is mounted onto top panel 30, and cap 332 of tank assembly 320 secures at top panel 30. Housing assembly 20 further houses transceiver/controller enclosure 60. In a preferred embodiment, valve assembly 170 is a three-way valve assembly.

Present invention 10 further comprises programmable remote-control transceiver 160 and handheld remote control transceiver 370.

Programmable remote-control transceiver 160 has a wireless technology standard programmable radio frequency remote controller allowing a smart device application to program actuation days on a 7-day calendar, select the times of actuations per day, and the duration of those actuations in 15 second intervals of up to 2 minutes. The wireless technology standard programmable radio frequency remote controller communicates to transceiver/controller enclosure 60 at the time of actuation by transmitting one pulse per 15 seconds of requested runtime.

Handheld remote control transceiver 370 provides users a transmit button for pulse activating of transceiver/controller enclosure 60 for 15 seconds per pulse.

Figure 4:
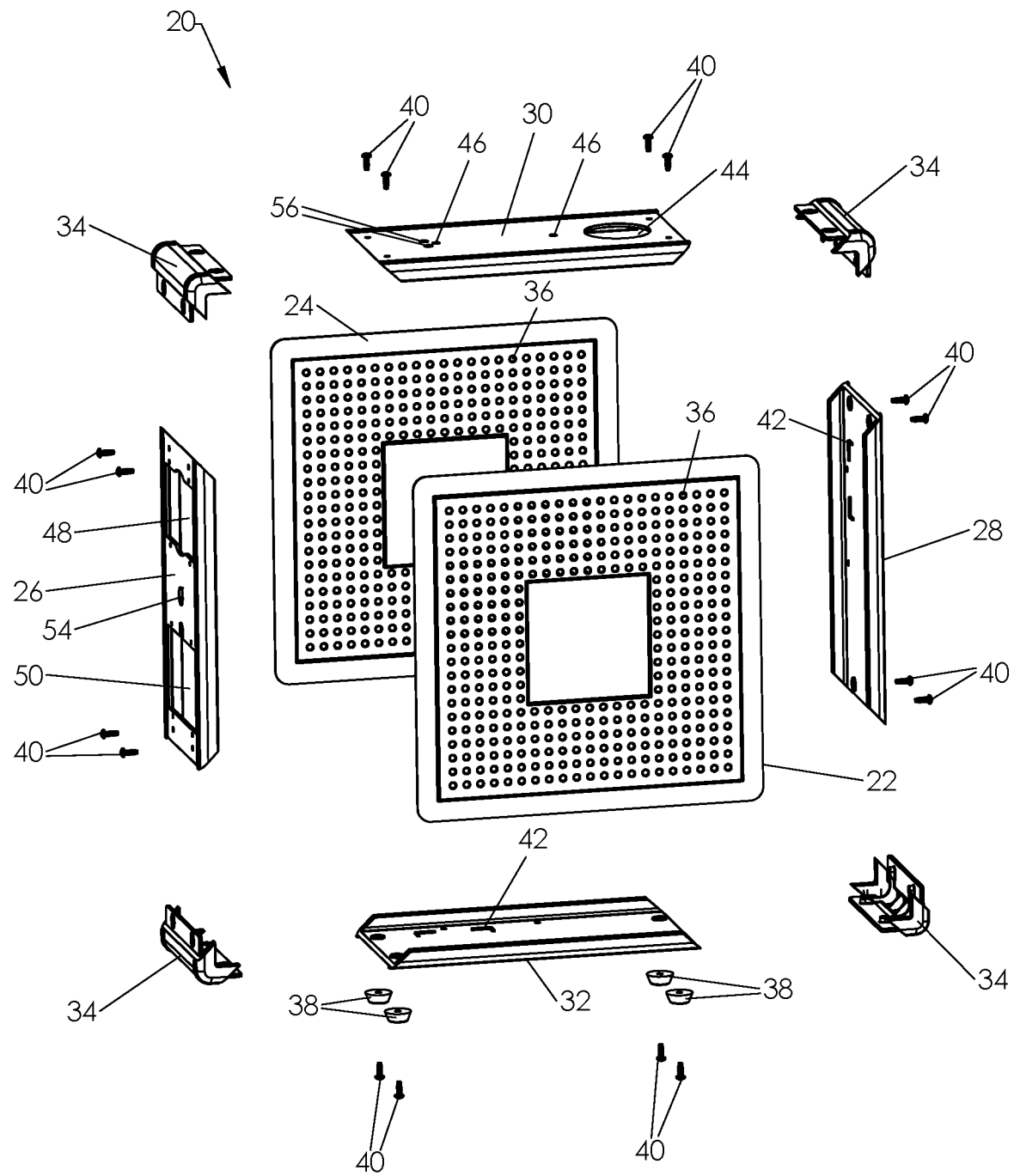
FIG. 4 is an exploded view of a housing assembly of the present invention.

As seen in FIG. 4 housing assembly 20 comprises first and second flat panels 22 and 24, front panel 26, rear panel 28, top panel 30, bottom panel 32, and locking corners 34 with corner screws 40.

First and second flat panels 22 and 24 comprise air inlet holes 36. Air inlet holes 36 are designed to prevent rodent and/or insect intrusion. Front panel 26 comprises blower panel hole 48, control panel hole 50, and valve threaded neck hole 54. Top panel 30 comprises tank neck hole 44, handle mount holes 46, and wire passage hole 56. Handle mounting holes 46 allow securing handle assembly 380, as seen in FIG. 1, onto top panel 30. In a preferred embodiment, rear panel 28 and bottom panel 32 are identical inside. Rear panel 28 and bottom panel 32 both comprise battery trap 42. Bottom panel 32 also comprises legs 38. Legs 38 are secured with corner screws 40 positioned onto bottom panel 32. In a preferred embodiment, bottom panel 32 comprises weep holes to prevent standing water inside.

In a preferred embodiment, front panel 26, rear panel 28, top panel 30, and bottom panel 32 each have a slit to restrain first and second flat panels 22 and 24 when connected with locking corners 34. Locking corners 34 are designed with injection molding features and utilize a locking system to minimize hardware requirements while simultaneously holding the structure at approximately 90 degrees.

Corner screws 40 can be self-threading plastic screws. Front panel 26, rear panel 28, top panel 30, and bottom panel 32 each comprise holes to receive corner screws 40.

Figure 5:
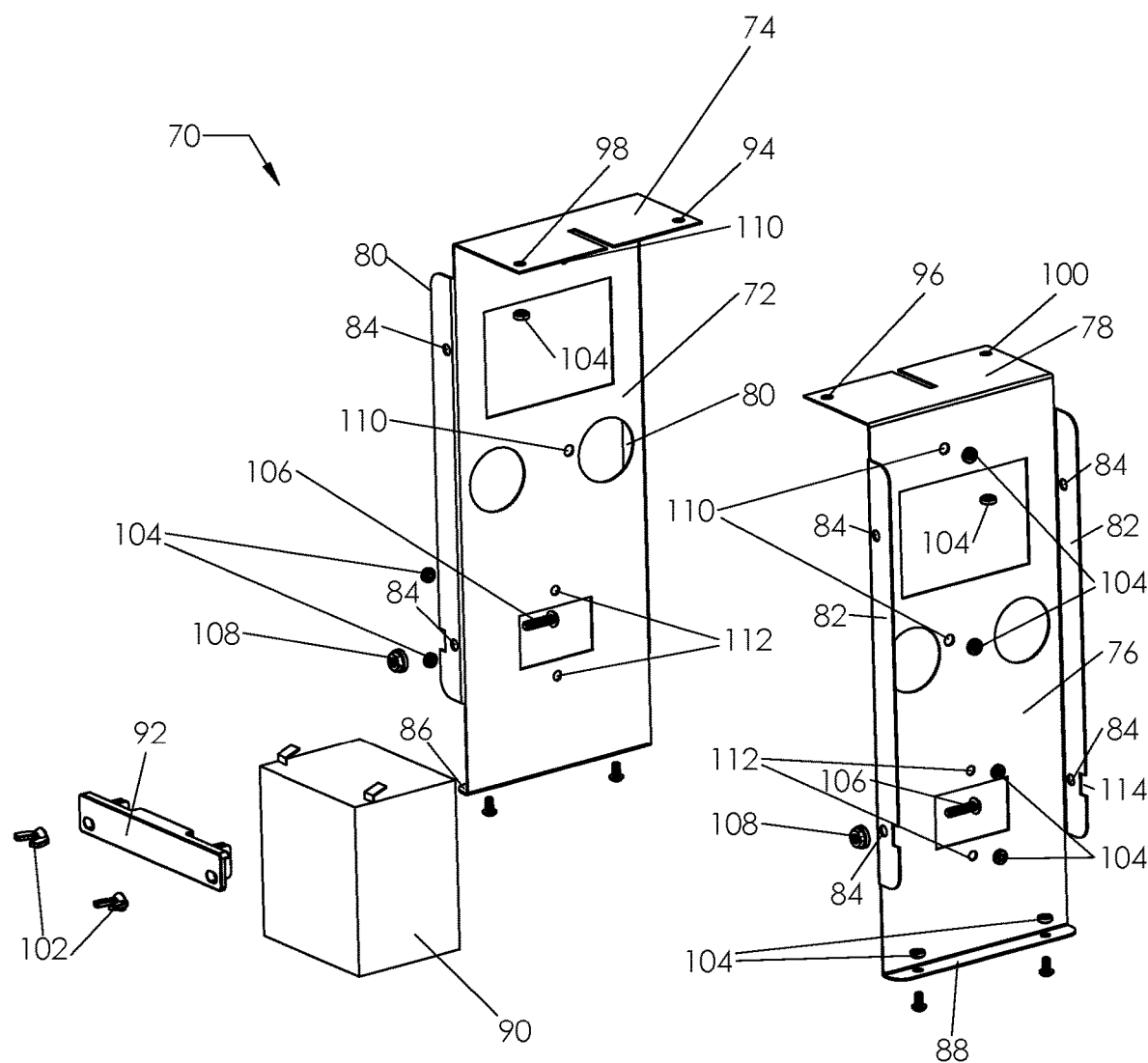
FIG. 5 is an exploded view of a frame assembly of the present invention.

As seen in FIG. 5, frame assembly 70 comprises first and second frames 72 and 76. First frame 72 has top wall 74, first and second lateral stiffeners 80, and bottom panel attachment base 86. First and second lateral stiffeners 80 comprise tank centering holes 84. Second frame 76 has top wall 78, first and second lateral stiffeners 82, and bottom panel attachment base 88. First and second lateral stiffeners 82 also comprise tank centering holes 84.

Figure 14:
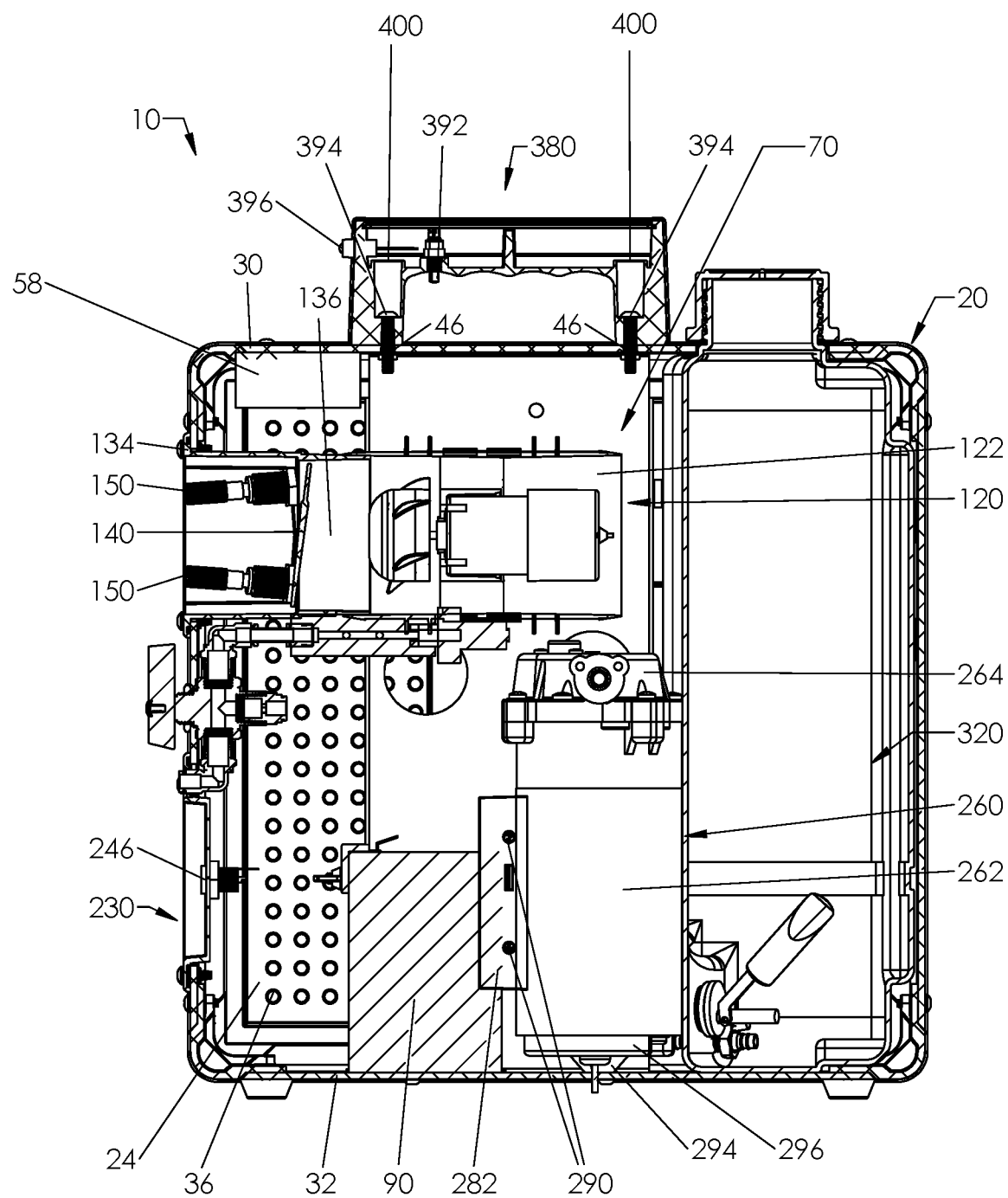
FIG. 14 is a cut view taken along lines 14-14 as seen in FIG. 1.

Top wall 74 comprises handle hole 94 and handle unified nut hole 98. Top wall 78 comprises handle hole 96 and handle unified nut hole 100. First and second frames 72 and 76 respectively comprise blower unified nut holes 110 and bracket unified holes 112. Blower unified nut holes 110 and bracket unified holes 112 receive mist blower assembly 120 and pump-motor assembly 260, as seen in FIG. 14, respectively.

Frame assembly 70 further comprises battery 90 and battery retainer 92 with battery retainer wingnuts 102. Battery retainer 92 secures battery 90 and is fixed with battery retainer stud bolts 106 with respective retainer stud bolt nuts 108.

Figure 6:
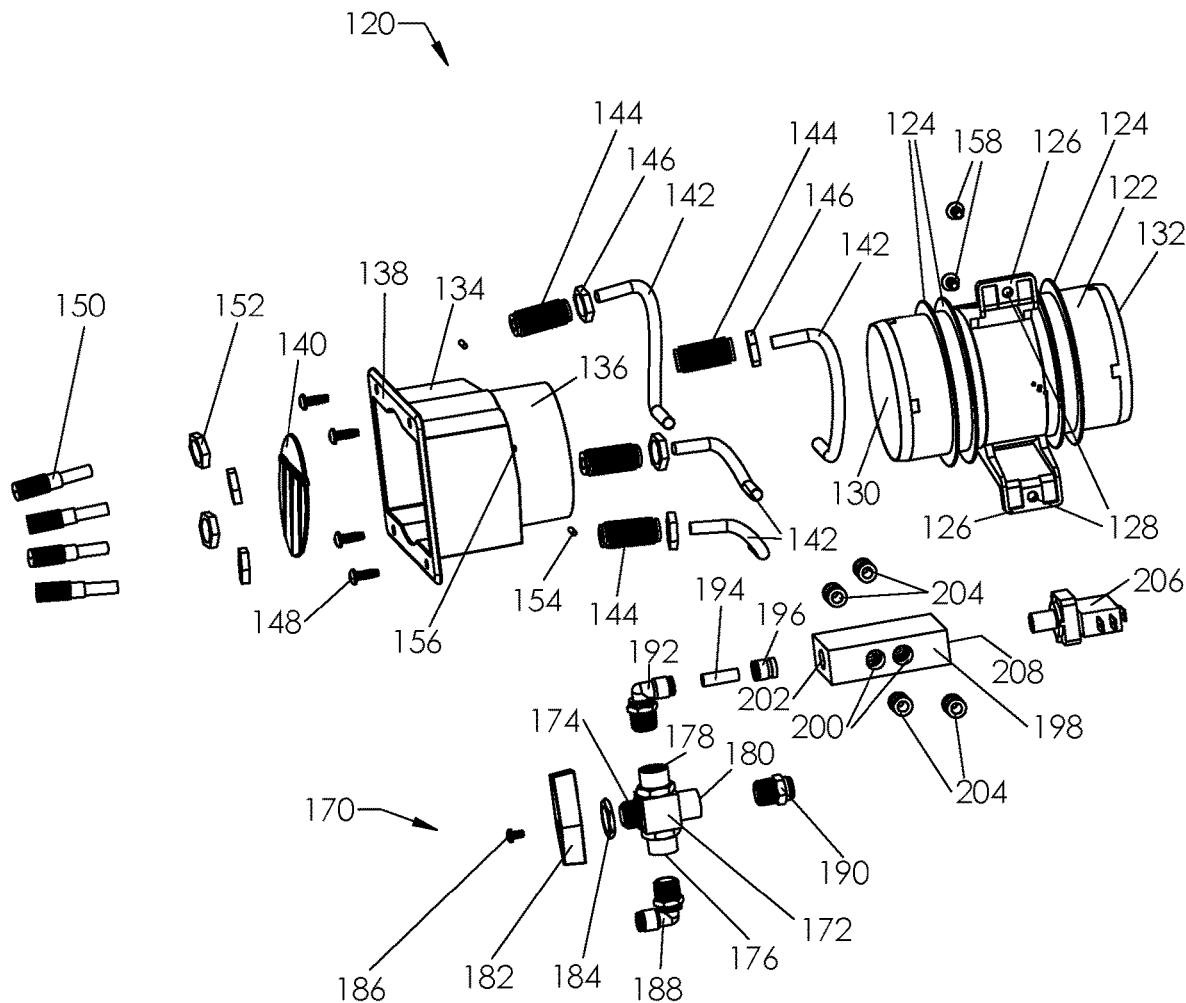
FIG. 6 is an exploded view of a mist blower assembly and valve assembly of the present invention.

As seen in FIG. 6, mist blower assembly 120 comprises blower 122 having blower flanges 124, first and second blower bases 126 with respective blower base mounting holes 128, blower outlet 130, and blower inlet 132.

Mist blower assembly 120 further comprises recess blower panel 134, blower shroud 136, blower bezel 138, blower shroud flapper 140, bulkhead supply tubes 142, bulkhead unions 144, screws 148, and nozzles 150. In a preferred embodiment, there are four nozzles 150. Bulkhead unions 144 have inner bulkhead union nuts 146 and outer bulkhead union nuts 152. Mist blower assembly 120 further comprises flapper hinge pins 154, hinge pin holes 156, and blower mounting screws 158.

Blower shroud 136 fits into blower 122. Blower shroud 136 comprises a blower shroud slot for wires passage, which is also used as a stop for blower shroud flapper 140, removing the need for a hard stop. Blower shroud flapper 140 keeps rodents from entering through blower shroud 136. Present invention 10 can provide misting protection in three ways, remote stationary misting, a portable wand misting, and a portable mist-blower option, which are selected by rotating valve handle 182 to point up for mist blower and down for remote misting.

Valve assembly 170 comprises valve body 172 having threaded valve neck 174, outlet port 176, outlet port 178, and inlet port 180. Valve handle 182 is secured by handle screw 186. Valve body 172 is secured to front panel 26 by threaded valve neck 174 passing through valve threaded neck hole 54 and secured by retainer nut 184. Valve assembly 170 further comprises first and second adapting elbows 188 and 192, and thru adapter 190, whereby adapting elbow 188 is connected to outlet port 176, thru adapter 190 is connected to inlet port 180, and adapting elbow 192 is connected to outlet port 178.

Valve assembly 170 further comprises manifold 198 having output connector ports 200 and input connector port 202. Output connectors 204 are positioned on output connector ports 200, and input connector 196, connected to tube 194, is positioned on input connector port 202. Tube 194 connects adapting elbow 192 and input connector 196. Manifold 198 further comprises pressure switch 206 connected into pressure switch port 208.

Figure 7:
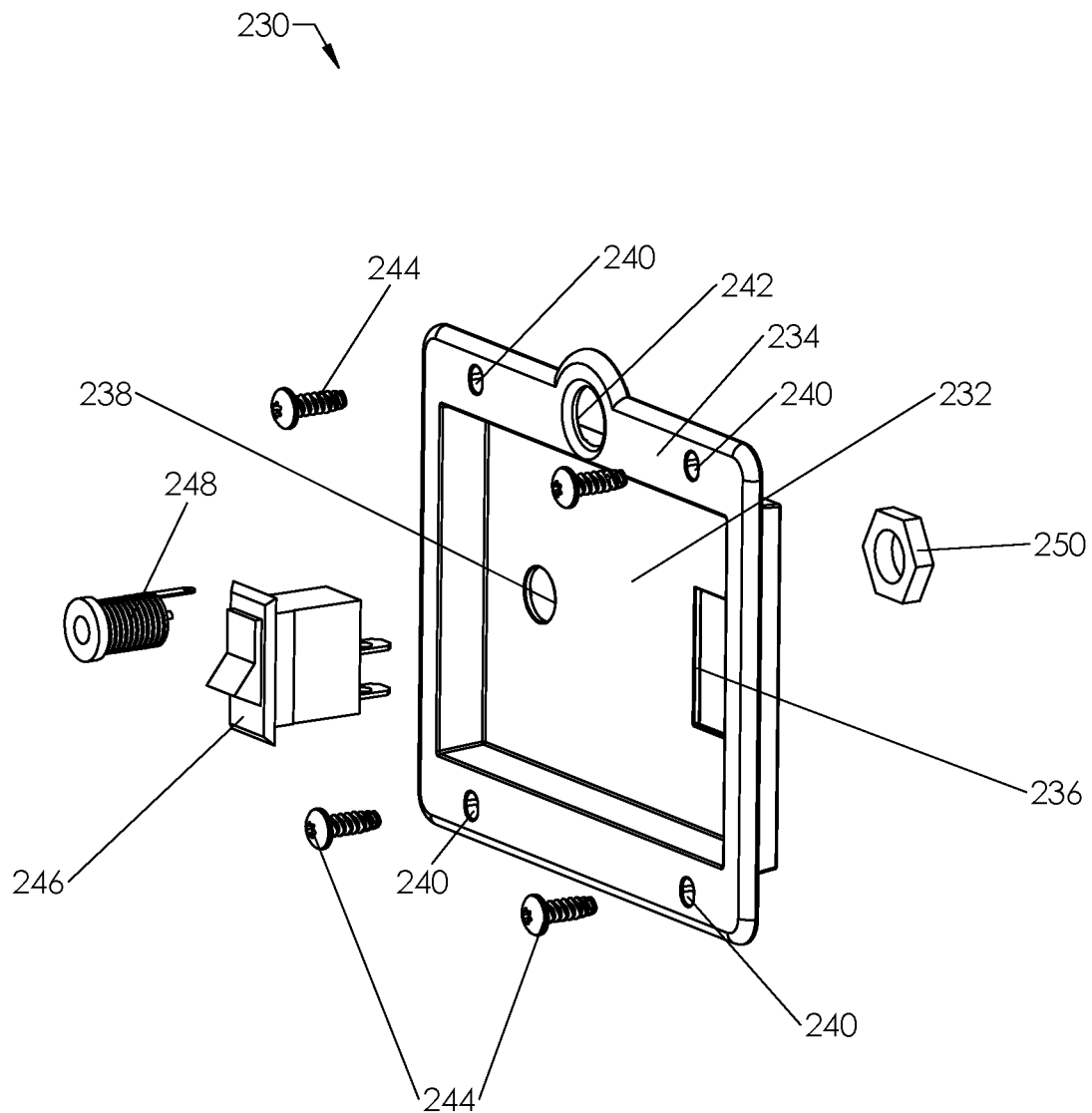
FIG. 7 is an exploded view of a recess control panel assembly of the present invention.

As seen in FIG. 7, recess control panel assembly 230 comprises recess control panel 232 having control bezel 234. Recess control panel 232 has switch hole 236 to receive switch 246, and power jack hole 238 to receive power jack 248. Power jack 248 comprises power jack retainer nut 250.

Control bezel 234 comprises mounting holes 240 and mister output hole 242. Mounting holes 240 receive recess panel screws 244 to secure recess control panel assembly 230.

Figure 8:
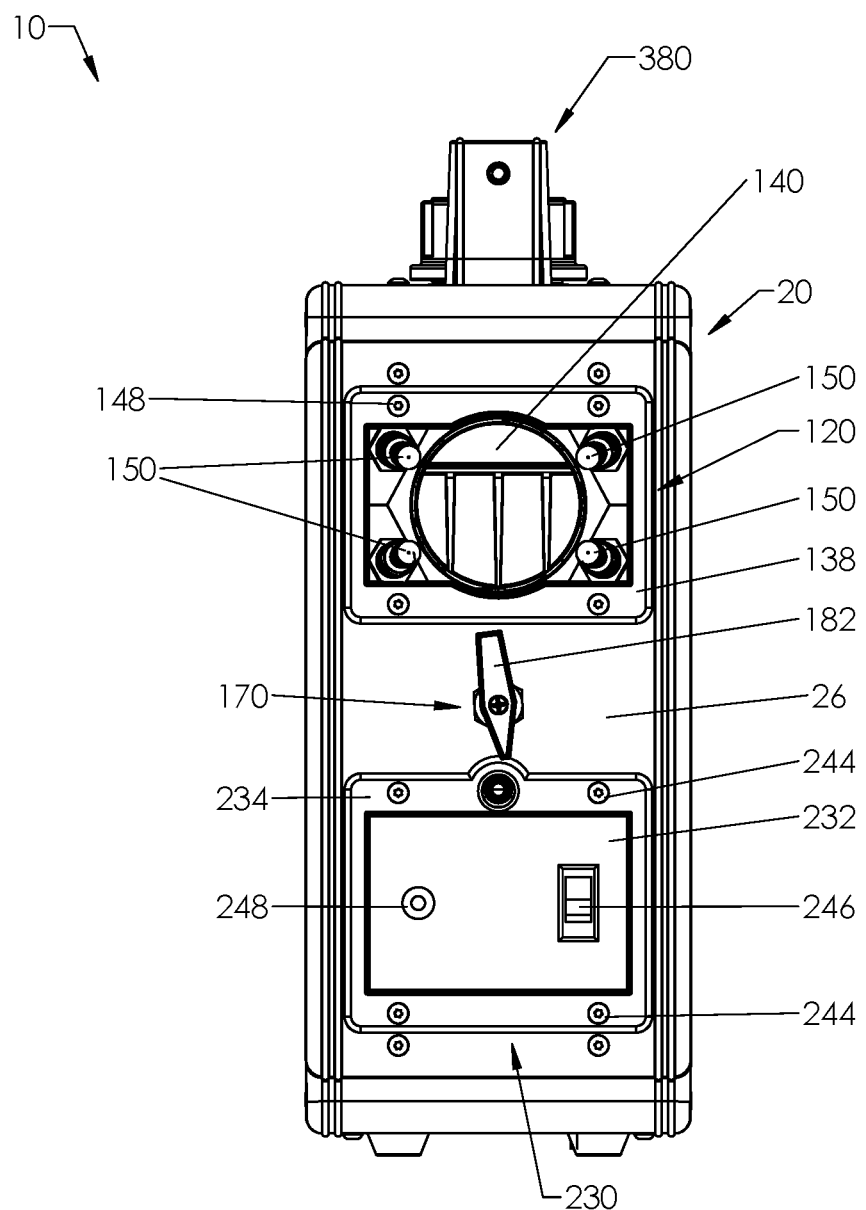
FIG. 8 is a front view of the present invention.

As seen in FIG. 8, mist blower assembly 120, valve assembly 170, and recess control panel assembly 230 mount onto housing assembly 20, specifically onto front panel 26. Mist blower assembly 120 is mounted on blower panel hole 48 seen in FIG. 4, whereby blower bezel 138 is fixed with screws 148 onto front panel 26. Blower shroud flapper 140 and nozzles 150 are exposed on front panel 26. Threaded valve neck 174, seen in FIG. 6, with valve handle 182 mounted thereon extends from valve threaded neck hole 54, seen in FIG. 4. Recess control panel assembly 230 mounts onto front panel 26, whereby control bezel 234 is mounted onto control panel hole 50 seen in FIG. 4, and recess panel screws 244 fix control bezel 234 onto front panel 26. Recess control panel 232 with switch 246 and power jack 248 are exposed on front panel 26.

Figure 9:
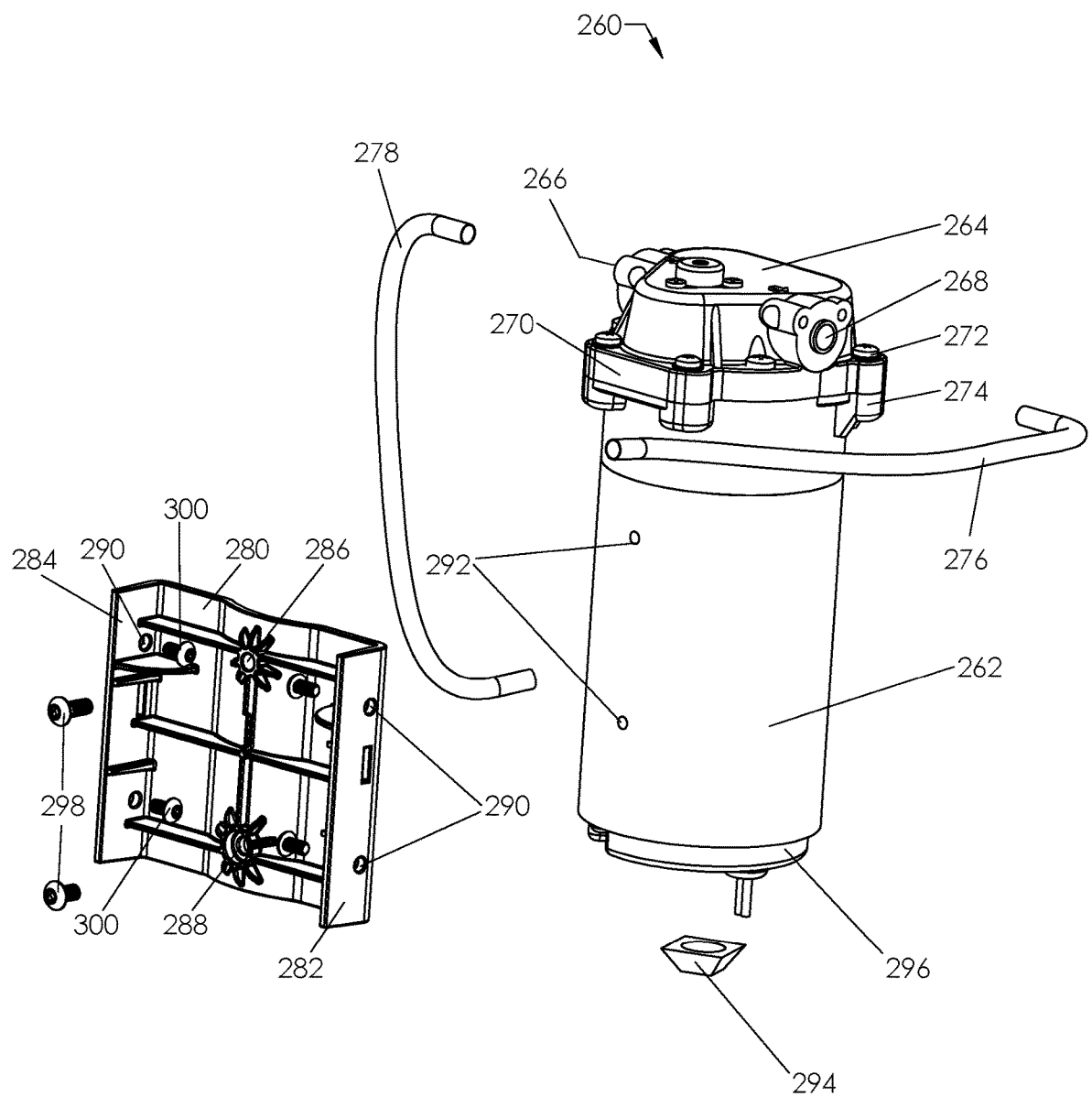
FIG. 9 is an isometric view of a pump-motor assembly of the present invention.

As seen in FIG. 9, pump-motor assembly 260 comprises motor 262 attached to pump 264. Pump 264 comprises pump inlet connector 266, pump outlet connector 268, pump base 270, outlet tube 276, and inlet tube 278. Pump 264 is attached to motor 262 by screws 272 secured at screw post 274.

Motor 262 comprises motor-battery bracket 280 fixed thereto. Motor-battery bracket 280 comprises bracket lateral walls 282 and 284. Motor-battery bracket 280 is fixed to motor 262, whereby motor mounting screws 298 pass through first and second motor mount holes 286 and 288 to be fixed on motor mounting holes 292.

Bracket lateral walls 282 and 284 secure pump-motor assembly 260 onto respective first and second frames 72 and 76, as seen in FIG. 5. In a preferred embodiment, bracket mounting screws 300 pass through respective bracket mounting holes 290 and respective bracket unified holes 112 and are secured by unified nuts 104, as seen in FIG. 5.

Figure 10:
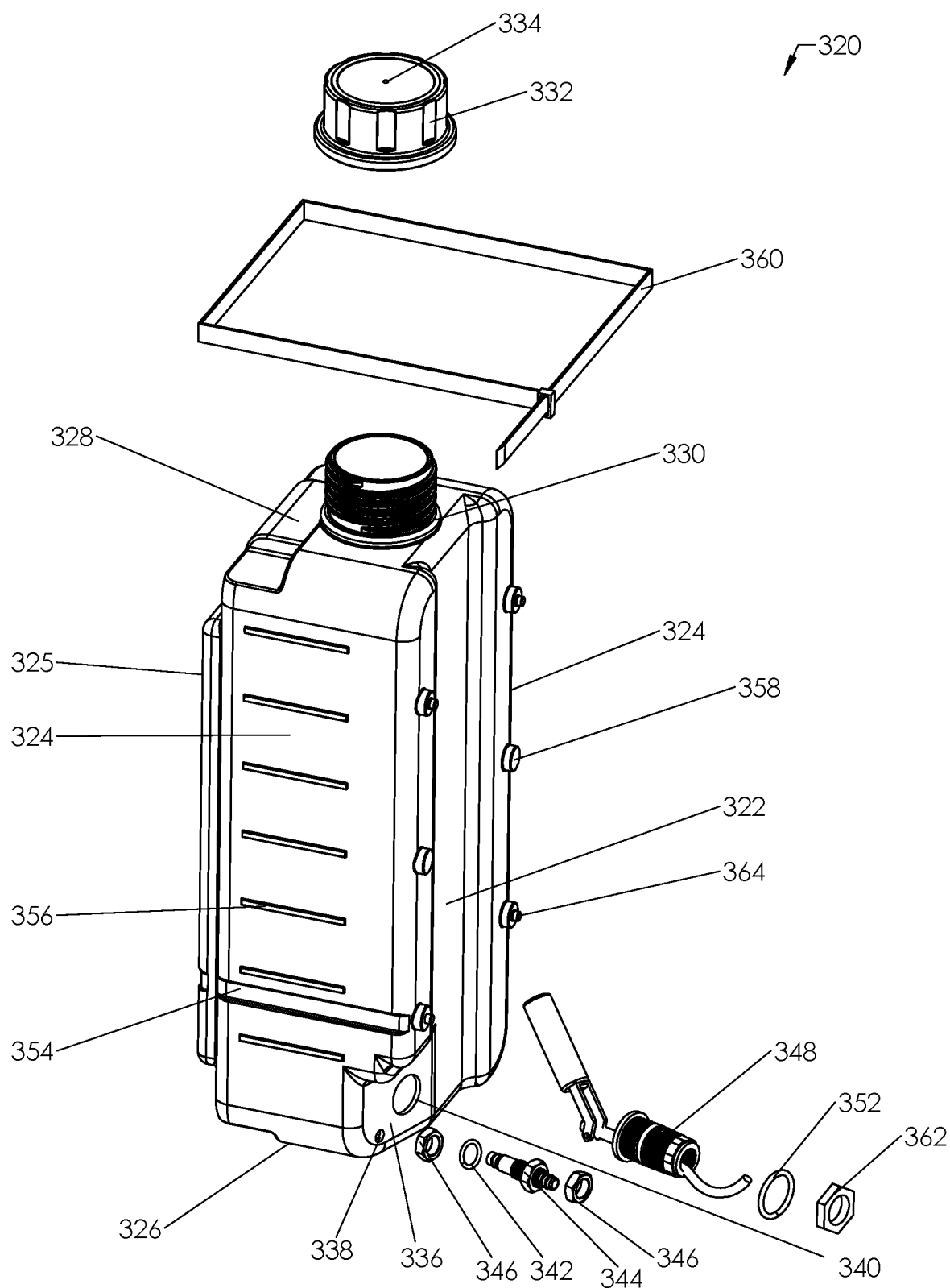
FIG. 10 is an exploded view of a tank assembly of the present invention.

As seen in FIG. 10, tank assembly 320 comprises front side 322, lateral sides 324, rear side 325, bottom side 326, and top side 328.

Front side 322 comprises hardware face 336 having outlet port 338 and float port 340. Outlet port 338 receives pick up nipple 344 with ring 342 and nuts 346. Float port 340 receives tank float switch 348 with ring 352 and float switch nut 362. Front side 322 further comprises tank centering posts 364 and tank stand-offs 358 for securing onto frame assembly 70, as seen in FIG. 14. The securing is achieved with self-locking tank strap 360 that secures tank assembly 320 and frame assembly 70 together, seen in FIG. 5, when settled in strap recess 354 on lateral sides 324 and rear side 325.

Lateral sides 324 each also comprises air gap ribs 356 allowing first and second flat panels 22 and 24, seen in FIG. 4, space for improved airflow. Top side 328 comprises tank neck 330 having cap 332 with duckbill vent hole 334.

Figure 11:
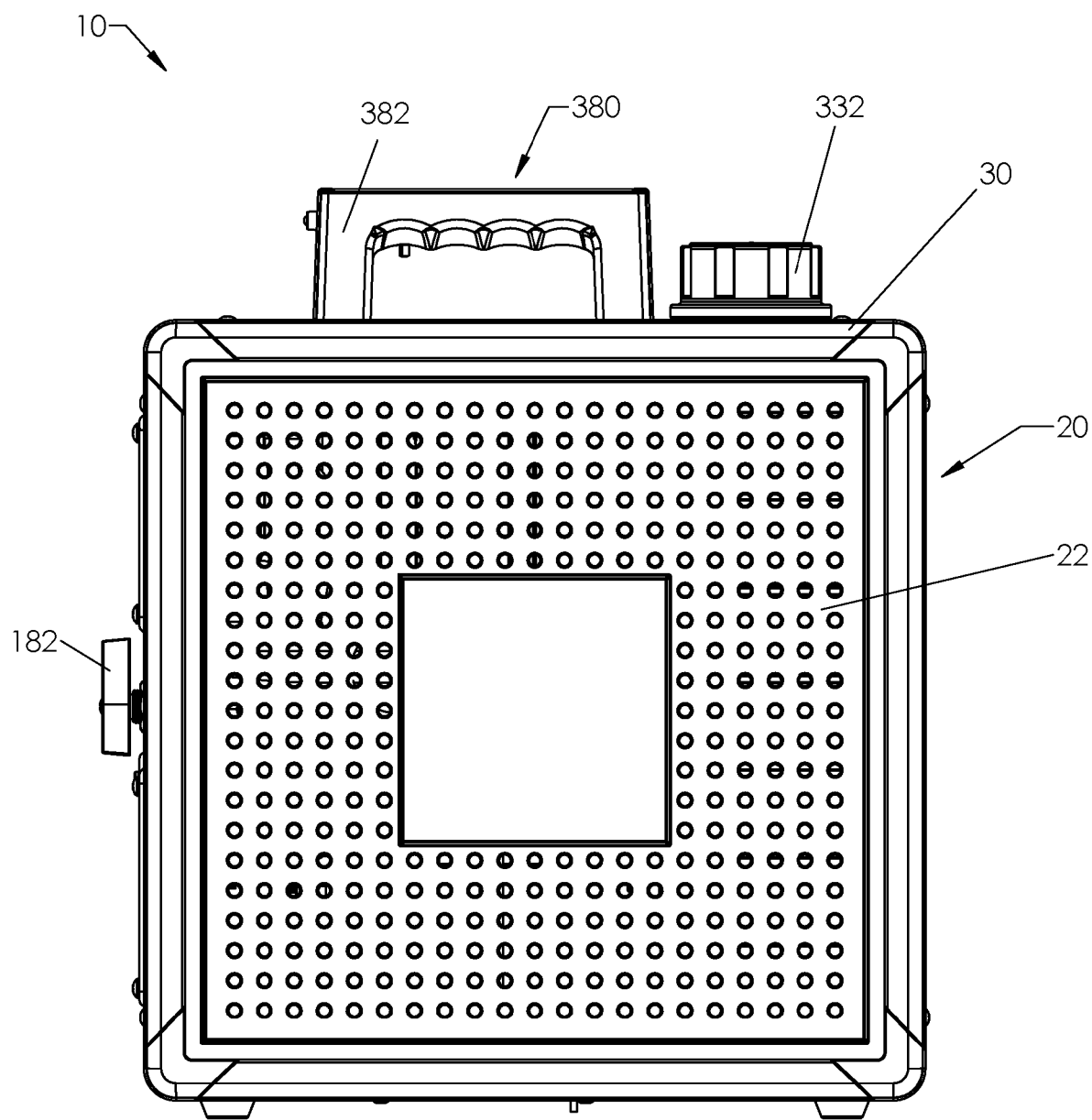
FIG. 11 is a lateral view of the present invention.
Figure 12:
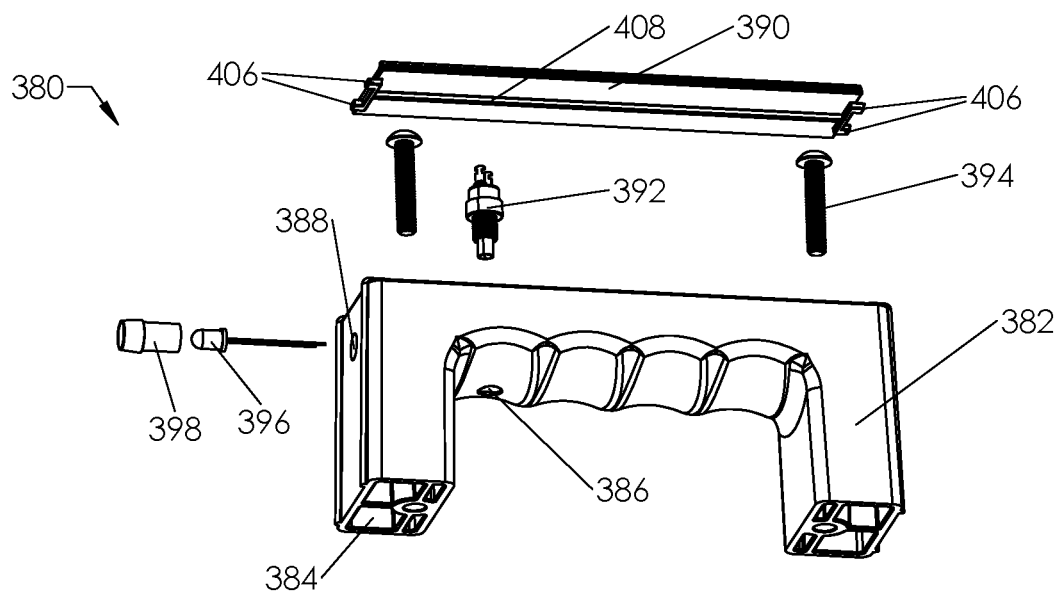
FIG. 12 is an exploded bottom view of a handle assembly of the present invention.
Figure 13:
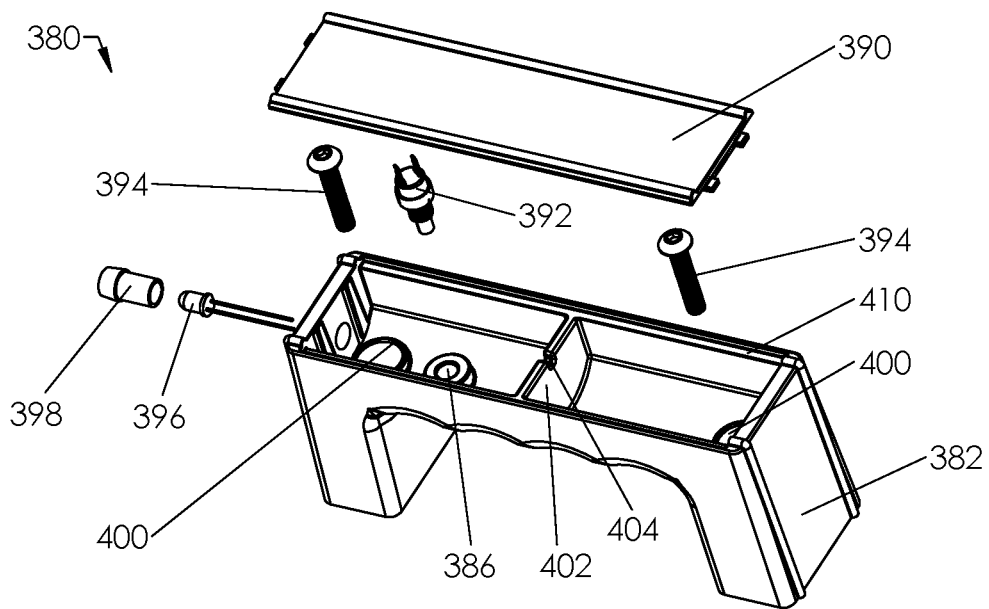
FIG. 13 is an exploded top view of the handle assembly of the present invention.

As seen in FIGS. 11, 12, and 13 handle assembly 380 is mounted onto top panel 30. Handle assembly 380 comprises handle body 382. Handle body 382 has wire passage 384, micro switch hole 386, and light-emitting diode housing hole 388. Light-emitting diode housing hole 388 receives light-emitting diode housing 398 with light-emitting diode 396. Micro switch hole 386 receives micro switch 392. Micro switch 392 when depressed activates present invention 10. Micro switch 392 allows using mist blower assembly 120, seen in FIG. 6, without having to press a RF remote to activate. Micro switch 392 is located in a section for finger channeling.

Handle assembly 380 further comprises cover plate 390 and mounting screw recesses 400. In a preferred embodiment, cover plate 390 comprises cover securing tabs 406 and cover plate rib 408. Cover securing tabs 406 hold cover plate 390 down into lip 410. In a preferred embodiment, handle body 382 further comprises stiffener 402 having rib recess 404 to receive cover plate rib 408.

As seen in FIG. 14, frame assembly 70 secures battery 90, mist blower assembly 120, and pump-motor assembly 260, whereby first and second blower bases 126, as seen in FIG. 6, are mounted onto second frame 76, seen in FIG. 5, and bracket lateral walls 282 and 284 are mounted onto first and second frames 72 and 76, seen in FIG. 5, respectively.

Housing assembly 20 houses frame assembly 70 and tank assembly 320, wherein tank assembly 320 is exteriorly secured to frame assembly 70 by self locking tank strap 360, seen in FIG. 10. Frame assembly 70 comprises tank strap notches 114, as seen in FIG. 5, to receive self locking tank strap 360. Motor 262 further comprises spacer 294 positioned between motor base 296 and bottom panel 32. Tank neck 330 is flared to snug top tank neck hole 44 on panel 30. This flare also secures tank assembly 320.

Blower shroud 136 fits into blower 122 and blower shroud 136 houses blower shroud flapper 140, which is secured by recess blower panel 134.

Transceiver/controller enclosure 60 is a weatherized enclosure containing a transceiver/controller to energize pump-motor assembly 260. Transceiver/controller enclosure 60 also provides current limiter for light-emitting diode 396.

When nozzles 150 are activated, blower 122 will automatically turn on by pressure switch 206 of manifold 198, seen in FIG. 6. Then, when deactivate, the misting will stop immediately but blower 122 will continue to run longer so nozzles 150 dry off. Pressure switch 206 automatically stops blower 122 when pressure of nozzles 150 sufficiently drops, reducing drippage.

Air for blower 122 intakes is pulled through air inlet holes 36. Outflow of blower 122 is protected by blower shroud flapper 140 designed to open outward when pressure is present, and gravity shuts when no pressure is present. Blower shroud flapper 140 covers exhaust and cannot be pushed inward, protecting against rodent and insect intrusion. The function of mist blower assembly 120 is to accelerate and propel the mist that outs from nozzles 150 forming a long-range column to maximize coverage.

Handle body 382 is secured into housing assembly 20, whereby mounting screws 394 pass through mounting screw recesses 400 and handle mount holes 46 securing through top panel 30 onto frame assembly 70 at handle unified nut holes 98 and 100.

In a preferred embodiment, tank assembly 320 is equipped with a low fluid sensor. Transceiver/controller enclosure 60 interprets the sensor and disables the pump during low fluid level, dims power light, and flashes power light when disabled by low fluid or freeze sensor by disabling actuation for 3 days. The control board responds to radio frequency (RF) remote or micro switch 392. Micro switch 392 has direct control and actuates any duration while pressed. Each radio frequency pulse adds 15 seconds of actuation time to the total runtime.

In another embodiment, present invention 10 may be activated by an application via wireless technology standard.

A smart device having wireless technology standard application for programmable remote control transceiver 160, as seen in FIG. 2, may set days, times, and durations into memory to control transceiver/controller enclosure 60. The application allows smart devices to actuate transceiver/controller enclosure 60 through programmable remote control transceiver 160, seen in FIG. 2.

Figure 15:
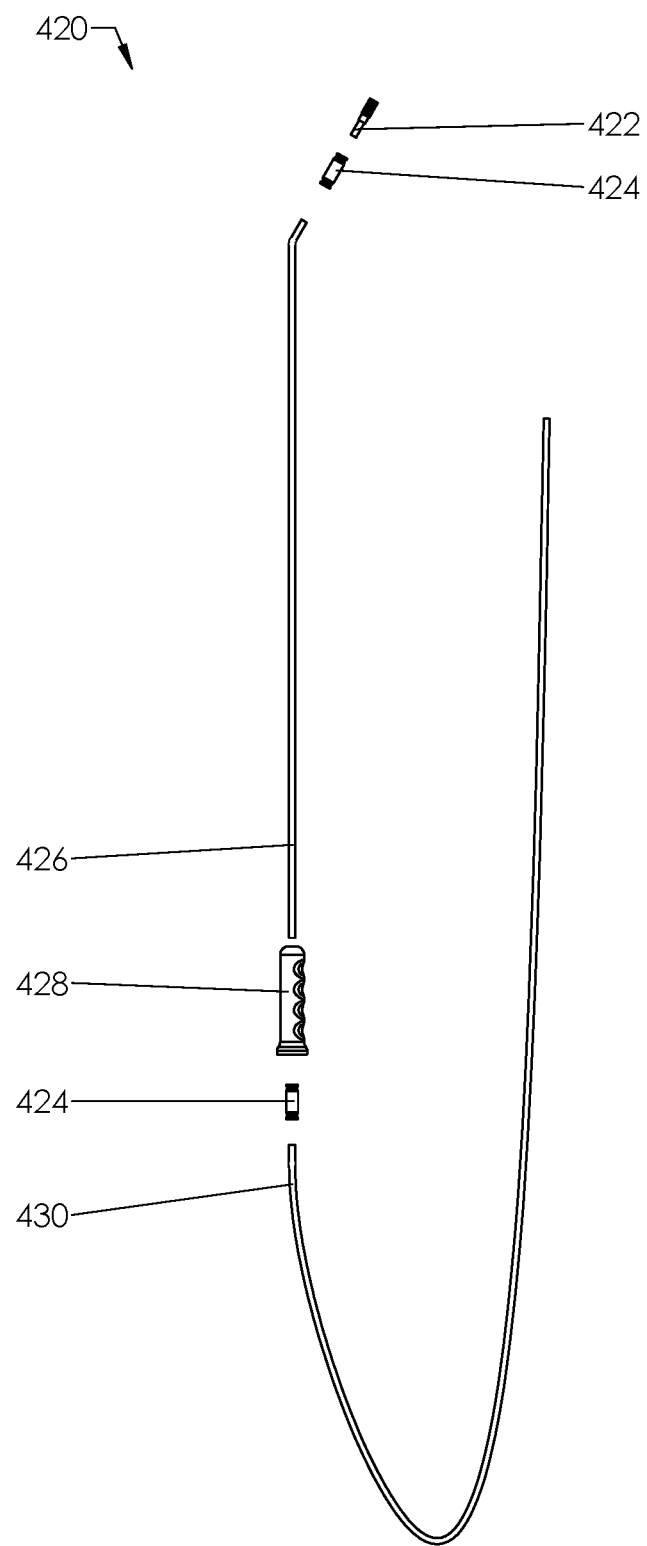
FIG. 15 is an exploded view of a misting wand assembly.

As seen in FIG. 15, present invention 10 may comprise misting wand assembly 420, which has misting nozzle 422, wand coupler 424, wand tube 426, wand handle 428, and wand hose 430. Misting wand assembly 420 may be used for direct applications in specific areas in portable mist wand applications actuated by micro switch 392.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multifunctional misting system, comprising:
A) a housing assembly comprising first and second flat panels, a front panel, a rear panel, a top panel, a bottom panel, and locking corners, said front panel comprising a blower panel hole, a control panel hole, and a valve threaded neck hole;
B) a frame assembly comprising a battery and a battery retainer;
C) a mist blower assembly mounted on said blower panel hole;
D) a valve assembly comprising a valve body, a threaded valve neck, first and second outlet ports, an inlet port, and a valve handle, said threaded valve neck with said valve handle mounted thereon extends from said valve threaded neck hole of said housing assembly;
E) a recess control panel assembly mounted on said control panel hole;

F) a pump-motor assembly, said frame assembly secures said mist blower assembly, said pump-motor assembly, and said battery;

G) a tank assembly comprising a self locking tank strap, said housing assembly houses said frame assembly and said tank assembly, wherein said tank assembly is exteriorly secured to said frame assembly by said self locking tank strap; and H) a handle assembly mounted onto said top panel.

2. The multifunctional misting system set forth in claim 1, further characterized in that said top panel comprises a tank neck hole.

3. The multifunctional misting system set forth in claim 1, further characterized in that said frame assembly comprises first and second frames, said first and second frames each comprises a top wall, first and second lateral stiffeners, and a bottom panel attachment base.

4. The multifunctional misting system set forth in claim 1, further characterized in that said mist blower assembly comprises a blower having a blower outlet and a blower inlet, first and second blower bases, a recess blower panel, a blower shroud, a blower shroud flapper, bulkhead supply tubes, and nozzles.

5. The multifunctional misting system set forth in claim 1, further characterized in that said valve assembly further comprises a manifold, first and second adapting elbows, a thru adapter, a tube, an input connector, output connectors, an input connector port, output connector ports, a pressure switch, and a pressure switch port.

6. The multifunctional misting system set forth in claim 1, further characterized in that said recess control panel assembly comprises a recess control panel, a control bezel, a switch, and a power jack.

7. The multifunctional misting system set forth in claim 1, further characterized in that said pump-motor assembly comprises a motor attached to a pump, said pump comprises a pump inlet connector, a pump outlet connector, a pump base, an outlet tube, and an inlet tube.

8. The multifunctional misting system set forth in claim 7, further characterized in that said motor comprises a motor-battery bracket fixed to said motor, said motor-battery bracket comprises first and second bracket lateral walls.

9. The multifunctional misting system set forth in claim 1, further characterized in that said tank assembly further comprises a front side, lateral sides, a bottom side, a top side, a tank neck, and a cap with a duckbill vent hole.

10. The multifunctional misting system set forth in claim 9, further characterized in that said front side comprises a hardware face having an outlet port to receive a pick up nipple and a float port to receive a tank float switch.

11. The multifunctional misting system set forth in claim 9, further characterized in that said lateral sides each comprises an strap recess and air gap ribs.

12. The multifunctional misting system set forth in claim 1, further characterized in that said handle assembly comprises a handle body having a wire passage, a cover plate, a micro switch, and a light-emitting diode housing with a light-emitting diode.

13. The multifunctional misting system set forth in claim 4, further characterized in that said blower shroud fits into said blower, and said blower shroud houses said blower shroud flapper, which is secured by said recess blower panel.

* * * * *